US012793980B2

(12) United States Patent
Tsuchiya et al.

(10) Patent No.: US 12,793,980 B2
(45) Date of Patent: Nov. 10, 2026

(54) LITHIUM-ION SECONDARY-BATTERY NEGATIVE ELECTRODE MATERIAL AND METHOD FOR MANUFACTURING SAME, LITHIUM-ION SECONDARY-BATTERY NEGATIVE ELECTRODE, AND LITHIUM ION SECONDARY BATTERY

(71) Applicant: RESONAC CORPORATION, Tokyo (JP)

(72) Inventors: Hideyuki Tsuchiya, Tokyo (JP); Yoshiyuki Matsumoto, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 622 days.

(21) Appl. No.: 18/257,589

(22) PCT Filed: Dec. 14, 2021

(86) PCT No.: PCT/JP2021/046085
§ 371 (c)(1),
(2) Date: Jun. 15, 2023

(87) PCT Pub. No.: WO2022/131262
PCT Pub. Date: Jun. 23, 2022

(65) Prior Publication Data

US 2024/0113296 A1 Apr. 4, 2024

(30) Foreign Application Priority Data

Dec. 16, 2020 (JP) ................................ 2020-208625

(51) Int. Cl.
*H01M 4/587* (2010.01)
*C01B 32/205* (2017.01)
(Continued)

(52) U.S. Cl.
CPC ........... *H01M 4/587* (2013.01); *C01B 32/205* (2017.08); *H01M 4/133* (2013.01);
(Continued)

(58) Field of Classification Search
CPC .. H01M 4/587; H01M 4/133; H01M 10/0525; H01M 2004/021;
(Continued)

(56) References Cited

U.S. PATENT DOCUMENTS 4,521,278 A * 6/1985 Kelley ..................... C10L 9/08 201/34
2005/0266314 A1* 12/2005 Sheem ................ H01M 4/0471 252/182.1
(Continued)

FOREIGN PATENT DOCUMENTS

CA 1224177 A * 7/1987 ................ C10L 9/08
CN 101980957 A 2/2011
(Continued)

OTHER PUBLICATIONS

RU 2255305 MT (Year: 2005).*
(Continued)

*Primary Examiner* — Alexander Usyatinsky
(74) *Attorney, Agent, or Firm* — SOLARIS Intellectual Property Group, PLLC

(57) ABSTRACT

A lithium-ion secondary-battery negative electrode material, consisting of graphite particles satisfying the following (1) to (3): (1) having a specific surface area of 2.7 $m^2/g$ or less; (2) having a compression pressure of 2.8 $kN/cm^2$ or more; and (3) having a value, representing elastic energy/plastic deformation energy, or 4 or more.

10 Claims, 2 Drawing Sheets

(51) Int. Cl.

| | |
|---|---|
| ***H01M 4/133*** | (2010.01) |
| ***H01M 10/0525*** | (2010.01) |
| *H01M 4/02* | (2006.01) |

(52) U.S. Cl.
CPC ..... *H01M 10/0525* (2013.01); *C01P 2004/01* (2013.01); *C01P 2004/20* (2013.01); *C01P 2006/12* (2013.01); *C01P 2006/40* (2013.01); *C01P 2006/90* (2013.01); *H01M 2004/021* (2013.01); *H01M 2004/027* (2013.01)

(58) Field of Classification Search
CPC .......... H01M 2004/027; C01P 2004/01; C01P 2004/20; C01P 2006/12; C01P 2006/90
See application file for complete search history.

(56) References Cited

U.S. PATENT DOCUMENTS

| | | | | |
|---|---|---|---|---|
| 2006/0131169 | A1 | 6/2006 | Yamamura et al. | |
| 2012/0077035 | A1 | 3/2012 | Spahr et al. | |
| 2013/0323601 | A1 | 12/2013 | Nishimura et al. | |
| 2014/0205532 | A1 | 7/2014 | Takeuchi et al. | |
| 2014/0255292 | A1 | 9/2014 | Wakizaka et al. | |
| 2017/0110729 | A1 | 4/2017 | Tsuchiya et al. | |
| 2017/0200950 | A1 * | 7/2017 | Gulas .................. | H01M 4/0404 |

FOREIGN PATENT DOCUMENTS

| | | | | | |
|---|---|---|---|---|---|
| CN | 106981657 | A | | 7/2017 | |
| EP | 1020944 | A2 | | 7/2000 | |
| JP | S6033208 | | * | 3/1985 | |
| JP | 2005-302725 | A | | 10/2005 | |
| JP | 2009-117334 | A | | 5/2009 | |
| JP | 2011-82054 | A | | 4/2011 | |
| JP | 2012-516826 | A | | 7/2012 | |
| JP | 2015-180598 | A | | 10/2015 | |
| JP | 2017-062992 | A | | 3/2017 | |
| JP | 2017-199572 | A | | 11/2017 | |
| JP | 2018-166107 | A | | 10/2018 | |
| RU | 2255305 | | * | 7/2005 | |
| SU | 1149880 | A3 | * | 4/1985 | ............. C10B 55/00 |
| TW | 201505242 | A | | 2/2015 | |
| WO | 2012/144618 | A1 | | 10/2012 | |
| WO | 2013/058347 | A1 | | 4/2013 | |
| WO | 2015/147012 | A1 | | 10/2015 | |

OTHER PUBLICATIONS

JPS6033208 MT (Year: 1983).*
SU 1149880 MT (Year: 1985).*
The decision of JPO to grant a Patent for Application JP 2022570015 (Year: 2025).*
The decision of KPO to grant a Patent for Application KR 20237022520 (Year: 2025).*

* cited by examiner

LITHIUM-ION SECONDARY-BATTERY NEGATIVE ELECTRODE MATERIAL AND METHOD FOR MANUFACTURING SAME, LITHIUM-ION SECONDARY-BATTERY NEGATIVE ELECTRODE, AND LITHIUM ION SECONDARY BATTERY

TECHNICAL FIELD

The present disclosure relates to a lithium-ion secondary-battery negative electrode material and a method for manufacturing the same, a lithium-ion secondary-battery negative electrode, and a lithium ion secondary battery.

BACKGROUND ART

Lithium ion secondary batteries, characterized by compactness in size, lightweightedness and high energy density, are widely used as a power source for electronic devices such as laptop personal computers (PCs), mobile phones, smart phones and tablet PCs. Against the backdrop of the environmental issues of recent years, such as global warming due to $CO_2$ emissions, electric automobiles such as electric vehicles (EV) that runs only by means of a battery, hybrid electronic vehicles (HEV) that run by means of a combination of a gasoline engine and a battery, and plug-in hybrid electric vehicles (PHEV) are becoming widely used, and lithium ion secondary batteries used for these electric automobiles have been under development.

It is known that the performance of a negative electrode material greatly affects the input characteristics of a lithium ion secondary battery. As a material for a negative electrode material for a lithium ion secondary battery, carbon materials are widely used. For example, a carbon material having a high degree of crystallinity, such as artificial graphite or spherical natural graphite that is obtained by spheroidizing scaly natural graphite particles, has been proposed as a material for a negative electrode that achieves a high degree of density.

As an artificial graphite, for example, International Publication No. 2015/147012 discloses a lithium-ion secondary-battery negative electrode material that includes composite particles, the composite particles including spherical graphite particles and plural flat graphite particles that are aggregated or joined such that oriented planes thereof are not parallel to each other. Japanese Patent Application Laid-Open No. 2005-302725 discloses a lithium-ion secondary-battery negative electrode material that includes carbon particles, in which plate-like particles are oriented and layered along a plane to form a primarily stable configuration, and having pores on a surface of the carbon particles.

SUMMARY OF INVENTION

Problem to be Solved

Automobiles for professional use such as buses and delivery cars for which it is easy to calculate the running distance are promising as prospective application targets of lithium ion secondary batteries for automobiles. These automobiles are mainly used in the daytime, and are becoming common in tropical areas. Therefore, improvement in high-temperature resistance is desired for lithium ion secondary batteries for automobiles.

Further, improvement in rapid-charging characteristics is desired for lithium ion secondary batteries for automobiles in order to adapt to a case in which lithium ion secondary batteries are charged at frequent intervals.

In view of the foregoing, the present disclosure aims to provide a lithium-ion secondary-battery negative electrode material from which a lithium ion secondary battery that exhibits excellent high-temperature resistance and rapid-charging characteristics is obtained, and a method for manufacturing the same. Further, the present disclosure aims to provide a lithium-ion secondary-battery negative electrode and a lithium ion secondary battery that are obtained from the lithium-ion secondary-battery negative electrode material.

Means for Solving Problem

The means for solving the problem includes the following embodiments.

<1> A lithium-ion secondary-battery negative electrode material, consisting of graphite particles satisfying the following (1) to (3):

(1) having a specific surface area of 2.7 $m^2/g$ or less;

(2) having a compression pressure of 2.8 $kN/cm^2$ or more; and (3) having a value, representing elastic energy/plastic deformation energy, or 4 or more.

<2> The lithium-ion secondary-battery negative electrode material according to <1>, having a spring-back ratio of 25% or more.

<3> The lithium-ion secondary-battery negative electrode material according to <1> or <2>, wherein the graphite particles comprise composite particles having a configuration in which plural flat graphite particles are layered.

<4> A method for manufacturing a lithium-ion secondary-battery negative electrode material, the method comprising graphitizing a coke that satisfies the following (1) and (2):

(1) having a thermal expansion coefficient of $2.9\times10^{-6}/°$ C. or less after calcination at 1400° C.; and (2) having a Hardgrove Grindability Index (HGI) of 47 or less after calcination at 1200° C.

<5> The method for manufacturing a lithium-ion secondary-battery negative electrode material according to <4>, wherein the coke has a butanol absolute specific gravity of 2.05 or more after calcination at 1200° C.

<6> The method for manufacturing a lithium-ion secondary-battery negative electrode material according to claim 4 or claim 5, wherein the coke has a pore volume of 0.90 mL/g or less.

<7> The method for manufacturing a lithium-ion secondary-battery negative electrode material according to any one of <4> to <6>, wherein the coke has a pore specific surface area of 3.0 $m^2/g$ or less.

<8> The method for manufacturing a lithium-ion secondary-battery negative electrode material according to any one of <4> to <7>, comprising manufacturing the lithium-ion secondary-battery negative electrode material according to any one of <1> to <3>.

<9> A lithium-ion secondary-battery negative electrode, comprising a negative electrode material layer that comprises the lithium-ion secondary-battery negative electrode material according to any one of <1> to <3>, and a current collector.

<10> A lithium ion secondary battery, comprising the lithium-ion secondary-battery negative electrode according to <9>, a positive electrode, and an electrolyte.

Effect of the Invention

According to the present disclosure, it is possible to provide a lithium-ion secondary-battery negative electrode material from which a lithium ion secondary battery that exhibits excellent high-temperature resistance and rapid-charging characteristic, and a method for manufacturing the same. Further, it is possible to provide a lithium-ion secondary-battery negative electrode and a lithium ion secondary battery that are obtained from the lithium-ion secondary-battery negative electrode material.

EMBODIMENTS FOR IMPLEMENT INVENTION

Figure 1:
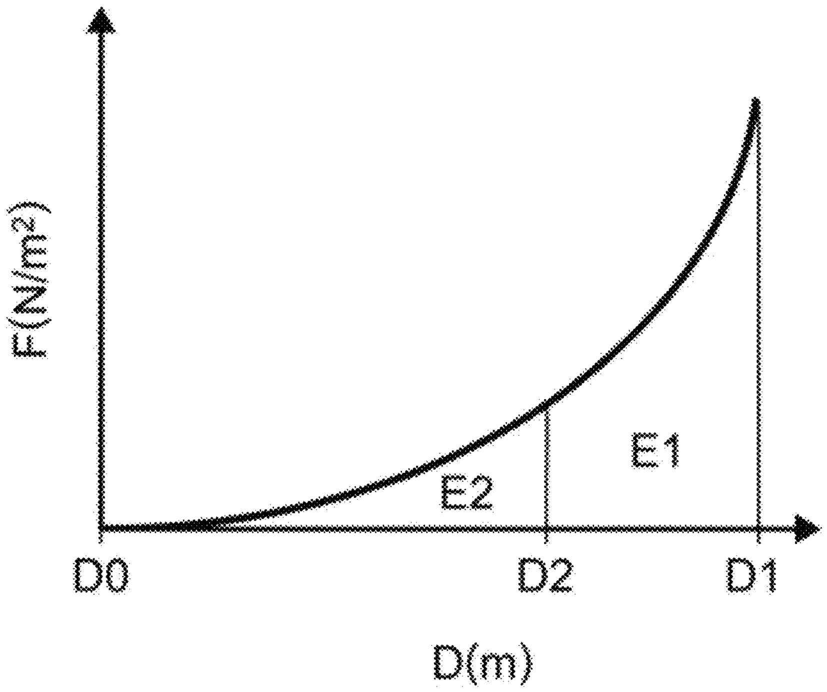
FIG. 1 is a graph showing an elastic energy and a plastic deformation energy.

Embodiments for carrying out the present invention will now be described in detail. However, the invention is in no way limited to the following embodiments.

In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "from * to" represents a range in which numerical values described before and after the "to" are included in the range as a minimum value and a maximum value, respectively.

In a numerical range described in stages, in the present disclosure, an upper limit value or a lower limit value described in one numerical range may be replaced with an upper limit value or a lower limit value in another numerical range described in stages. Further, in a numerical range described in the present disclosure, the upper limit value or the lower limit value in the numerical range may be replaced with a value shown in the Examples.

In the present disclosure, each component may include plural kinds of substances corresponding to the component. In a case in which plural kinds of substances corresponding to each component are present in a composition, the content ratio or content of each component refers to the total content ratio or content of the plural kinds of substances present in the composition, unless otherwise specified.

In the present disclosure, particles corresponding to each component may include plural kinds of particles. In a case in which plural kinds of particles corresponding to each component are present in a composition, the particle size of each component refers to the value of the particle size of a mixture of the plural kinds of particles present in the composition, unless otherwise specified.

In the present disclosure, the term "layer" or "film" includes, when a region where a layer or a film is present is observed, a case in which a layer or film is formed at a portion of the region, in addition to a case in which a layer or a film is formed at an entire region.

In the present disclosure, the term "layering" refers to disposing a layer on a different layer, and the layers may be joined or separable.

In the present disclosure, the particle distribution of a negative electrode material and primary particles included in composite particles may be measured by a laser diffraction particle size distribution analyzer. The average particle size of the particles refers to a particle size at which a cumulative volume from a side of small size is 50% (D50) in a volume-based particle size distribution. D90 refers to a particle size at which a cumulative volume from a side of small size is 90% in a volume-based particle size distribution. D10 refers to a particle size at which a cumulative volume from a side of small size is 10% in a volume-based particle size distribution.

<Lithium-Ion Secondary-Battery Negative Electrode Material>

The lithium-ion secondary-battery negative electrode material (hereinafter, also referred to as a negative electrode material) of the present disclosure consists of graphite particles satisfying the following (1) to (3):

(1) having a specific surface area of 2.7 $m^2/g$ or less;

(2) having a compression pressure of 2.8 $kN/cm^2$ or more; and (3) having a value, representing elastic energy/plastic deformation energy, or 4 or more.

A lithium ion secondary battery using the graphite particles satisfying (1) to (3) as a negative electrode material exhibits excellent high-temperature resistance and excellent rapid-charging characteristics. While the reason for this remains somewhat unclear, it is thought to be as follows.

By having (1) a specific surface area of 2.7 $m^2/g$ or less, graphite particles have a relatively small area at which each particle contacts an electrolyte. Therefore, for example, it is thought that a decomposition reaction of an electrolyte at an interface with the particle is suppressed, and degradation of a battery is suppressed when used in a high-temperature environment.

In addition, by having (2) a compression pressure of 2.8 $kN/cm^2$ or more and having (3) a value, represented by elastic energy/plastic deformation energy, or 4 or more, it is thought that the graphite particles are less prone to deformation or breakage. Therefore, it is thought that a sufficient amount of spaces through which an electrolyte can flow is secured among the graphite particles, thereby allowing the battery to adapt to rapid charging.

(1) Specific Surface Area

The specific surface area of the graphite particles is not particularly limited, as long as it is 2.7 $m^2/g$ or less. From the viewpoint of suppressing decomposition of an electrolyte, the specific surface area of the graphite particles is preferably 2.5 $m^2/g$ or less, more preferably 2.2 $m^2/g$ or less, and further preferably 1.8 $m^2/g$ or less.

The specific surface area of the graphite particles may be 0.5 $m^2/g$ or more, 1.0 $m^2/g$ or more, or 1.2 $m^2/g$ or more. When the specific surface area of the graphite particles is 0.5 $m^2/g$ or more, rapid-charging characteristics of a battery tend to improve because a rapid increase in current density per unit area is suppressed and a load is reduced.

In the present disclosure, the specific surface area of graphite particles refers to a specific surface area calculated from a nitrogen adsorption measurement at 77K ($N_2$ specific surface area). The $N_2$ specific surface area may be calculated by a BET method from an adsorption isotherm obtained by a nitrogen adsorption measurement at 77K. Specifically, the specific surface area is calculated by a method described in the Examples.

The specific surface area of the graphite particles may be adjusted by a particle size distribution, a particle structure, or the like. In a case of pulverizing the graphite particles to reduce the particle size thereof, a specific surface area may significantly increase due to surface irregularities created during the pulverization. In such a case, it is possible to adjust the specific surface by applying a coating to the particles to smoothen the irregularities.

(2) Compression Pressure

The compression pressure of the graphite particles is not particularly limited, as long as it is 2.8 kN/cm$^2$ or more. From the viewpoint of suppressing the deformation or breakage of the graphite particles caused by pressurization during the manufacture of a negative electrode, the compression pressure of the graphite particles is preferably 2.9 kN/cm$^2$ or more, and more preferably 3.0 kN/cm$^2$ or more.

From the viewpoint of suppressing the deformation of a current collector or separation of a current collector from an active material due to pressurization during the manufacture of a negative electrode, the compression pressure of the graphite particles may be 4.5 kN/cm$^2$ or less, 4.3 kN/cm$^2$ or less, or 4.0 kN/cm$^2$ or less.

In order to suppress the separation of a current collector from an active material, it is possible to interpose a particle layer with a favorable binding ability between a current collector and a layer including graphite particles. In such a case, the graphite particles may have a greater compression pressure than the above-noted range.

In the present disclosure, the compression pressure of the graphite particles refers to an amount of a pressure that is required to compress the graphite particle to a predetermined density (1.8 g/cm$^3$). The greater the compression pressure is, the less likely it is that deformation or breakage of the graphite particles will occur as a result of pressurization thereof.

The compression pressure of the graphite particles is measured by the following process. Specifically, a predetermined amount of graphite particles (for example, 3.0 g) is loaded into a mold and compressed at a constant rate (for example, 10 mm/min). The amount of pressure (kN/cm$^2$) at which the density of the compressed graphite particles reaches 1.8 g/cm$^3$ is regarded as the compression pressure of the graphite particles.

In the measurement, for example, a mold having a diameter of 15 mm and an autograph (for example, "manufactured by Shimadzu Corporation") are used. The density of the graphite particles is calculated from a volume and a mass of the graphite particles loaded into the mold, and the volume is calculated from the base area of the mold (for example, 1.767 cm$^2$) and a distance between the base of the mold and a pressurized plane of the graphite particles loaded into the mold.

(3) Elastic Energy/Plastic Deformation Energy

The value represented by E1/E2, a ratio of the elastic energy E1 to the plastic deformation energy E2 of the graphite particles, is not particularly limited as long as it is 4 or more. From the viewpoint of suppressing deformation or breakage of the graphite particles caused by pressurizing the same during the manufacture of a negative electrode, the value of E1/E2 is preferably 6 or more, and more preferably 7 or more.

From the viewpoint of readily increasing the density of a negative electrode by pressurizing the same, the value of E1/E2 may be 15 or less, 12 or less, or 10 or less.

The value of E1/E2 refers to a relative relationship between a property of the graphite particles to return, when an external force applied thereto is removed, to an original state from a state of being deformed (elasticity), and a property of the graphite particles to remain, when an external force applied thereto is removed, in a state of being deformed (plastic deformation).

In the present disclosure, the elastic energy E1 and the plastic deformation energy E2 of the graphite particles are measured by a sectional measurement method.

Specifically, in the measurement test for the compression pressure of the graphite particles mentioned above, the amount of a force F (N/m$^2$) applied to the graphite particles is recorded each time a pressurized plane of the graphite particles moves by a predetermined distance d, and a total value of the products of f and d (f×d) is calculated. The distance d of the movement of the pressurized plane of the graphite particles is set at 2.0 μm or less (for example, 1.67 μm).

The elastic energy E1 and the plastic deformation energy E2 of the graphite particles correspond to an area indicated by E1 and an area represented by E2 in FIG. 1, respectively. In FIG. 1, the vertical axis indicates the pressure F (N/m$^2$) applied to the graphite particles, and the lateral axis indicates the displacement D (m) of a pressurized plane of the graphite particles. D0 indicates a displacement of the pressurized plane prior to the pressurizing; D1 indicates a displacement of the pressurized plane at which the density of the graphite particles is 1.8 g/cm$^3$; and D2 indicates a displacement of the pressurized plane at which the pressurized plane stops moving owing to elasticity, after the pressurizing.

The total energy E that has been applied to the graphite particles until the density thereof reaches 1.8 g/cm$^3$ is calculated. Specifically, the graphite particles are pressurized until the density thereof reaches 1.8 g/cm$^3$. During the pressurizing, the amount of a force F is continuously recorded until the density of the graphite particles reaches 1.8 g/cm$^3$; i.e., until the pressurized plane of the graphite particles reaches D1. Then, the total energy E is calculated by a sectional measurement method based on the recorded amount of pressure F.

Subsequently, pressurizing is discontinued when the density of the graphite particles reaches 1.8 g/cm$^3$. With the removal of pressure, the pressurized plane of the graphite particles moves in the opposite direction to the direction of movement shown during the pressurizing. The displacement of the pressurized plane at which the pressurized plane stops moving is referred to as D2.

In the total area corresponding to the total energy E obtained by a sectional measurement method, an area of a portion in a range of from DO to D2 corresponds to the plastic deformation energy E2, and an area of a portion in a range of from D2 to D1 corresponds to the elastic energy E1.

In the present disclosure, a carbon material having an average interplanar spacing ($d_{002}$) measured by X-ray diffraction of less than 0.340 nm is referred to as graphite.

In the present disclosure, particles in which low-crystalline carbon is disposed at least a portion of a surface of graphite particles are regarded as "graphite particles".

The theoretical value of the interplanar spacing ($d_{002}$) is 0.3354 nm. The closer the interplanar spacing of a material is to the theoretical value, the higher the degree of graphitization of the material is.

From the viewpoint of initial charge/discharge efficiency and energy density of a lithium ion secondary battery, the interplanar spacing ($d_{002}$) of the graphite particles is preferably 0.33600 nm or less, more preferably 0.33596 nm or less, further preferably 0.33592 nm or less.

From the above-noted standpoint, the interplanar spacing ($d_{002}$) of the graphite particles is preferably from 0.3354 nm to 0.33600 nm or less, more preferably from 0.3354 nm to 0.33596 nm or less, further preferably from 0.3354 nm to 0.33592 nm or less.

The interplanar spacing ($d_{002}$) of graphite particles can be calculated by a Bragg's equation from a diffraction peak corresponding to the carbon 002 plane, which appears at a position at which a diffraction angle 2θ is approximately from 24° to 27° in a diffraction profile. The diffraction profile is obtained by exposing a specimen to X-rays (CuKα) and measuring a diffraction line with a goniometer. Specifically, the measurement of interplanar spacing ($d_{002}$) can be conducted under the following conditions.

Radiation source: CuKα (wavelength: 0.15418 nm)

Output power: 40 kV, 20 mA

Sampling width: 0.010°

Scanning range: 10° to 35°

Scanning rate: 0.5°/min $$2d \sin \theta = n\lambda \qquad \text{Bragg's equation:}$$

In the equation, d refers to a period length, n refers to an order of reflection, and X refers to a wavelength of the X-ray.

(Structure of Graphite Particles)

Graphite particles may include particles have a structure in which plural graphite particles are aggregated or joined (hereinafter, also referred to as composite particles) or composite particles having a structure in which plural flat graphite particles are layered (hereinafter, also referred to as specific composite particles).

It is thought that specific composite particles can reduce a surface area inside the particles to be in contact with an electrolyte, thereby effectively suppressing decomposition of the electrolyte, as compared with composite particles having a structure in which major planes of plural flat graphite particles are oriented in random directions. Further, it is thought that specific composite particles are less likely to deform or break due to pressurization during the manufacture of a negative electrode, thereby readily securing pathways for an electrolyte to flow among particles.

Inside the composite particles in which major planes of plural flat graphite particles are oriented in random directions, an electrolyte tends to exhibit a low flow rate because of complicated migration/diffusion pathways. Therefore, it is thought that a sufficient degree of input/output performance may not be achieved due to inhibited diffusion, even when the active material has a large amount of particle interfaces. This phenomenon is particularly significant under the input/output conditions with a high degree of C rate.

The flat graphite particles included in the specific composite particles refer to non-spherical graphite particles having an anisotropic shape. Examples of the flat graphite particles include particles having a flaky shape, scaly shape or partially lumpy shape.

The composite particles refer to particles in which primary particles are aggregated or joined. In other words, the composite particles has a structure in which plural flat graphite particles are aggregated or joined in such a manner that the major planes of the particles are approximately parallel to each other. Accordingly, the plural flat graphite particles that constitute composite particles are layered in an approximately parallel manner. Whether or not the flat graphite particles are layered or not can be determined using an electron microscope.

The state in which plural flat graphite particles are aggregated or joined refers to a state in which two or more flat graphite particles are aggregated or joined. The state of joining refers to a state in which particles are chemically bonded directly or via a carbonaceous substance. The state of aggregating refers to a state in which particles maintain a gathered state by means of their morphological features or the like, without the action of chemical bonding.

The flat graphite particles may be aggregated or joined by means of a carbonaceous substance. Examples of the carbonaceous substance include graphite obtained by graphitization of an organic binder such as tar or pitch. Whether or not the flat graphite particles are aggregated or joined can be determined using a scanning electron microscope, for example.

The type of the flat graphite particles or raw materials thereof are not particularly limited, and examples thereof include artificial graphite, scale-shaped natural graphite, flake-shaped natural graphite, cokes, and resins. From the viewpoint of being less prone to deformation and having a small specific surface area, artificial graphite is preferred. When the raw material includes natural graphite, the content of natural graphite in the specific composite particles is preferably 40% by mass or less, from the viewpoint of inhibiting spheroidization and readily obtaining a lamellar configuration.

The average particle size of flat graphite particles that constitute specific composite particles is preferably from 5 μm to 25 μm, more preferably from 8 μm to 20 μm, further preferably from 10 μm to 15 μm, from the viewpoint of ease of aggregation or joining.

The average particle size of flat graphite particles may be measured by either one of the following methods.

A particle size (D50) obtained by a volume-based particle size distribution may be regarded as the average particle size of a flat-shaped graphitizable material used as the raw material of specific composite particles. The particle size (D50) corresponds to a particle size in a volume-based particle size distribution at which an accumulation of the volume from a smaller side is 50%.

A median value of particle sizes of arbitrarily selected 100 particles may be regarded as the average particle size of flat graphite particles. The measurement is conducted by observing a cross-section of specific composite particles with a scanning electron microscope, and an equivalent circle diameter, which is a diameter of a circle having an equivalent area to a projected area of an object, is regarded as the particle size of each particle.

The particle size distribution D90/D10 of flat graphite particles, included in the specific composite particles, is preferably 4.4 or less, more preferably 4.0 or less, further preferably 3.5 or less.

When the particle size distribution D90/D10 of flat graphite particles is 4.4 or less, variation in particle size of the flat graphite particles is relatively small. As a result, it is thought that an area inside the specific composite particles to be in contact with an electrolyte may be further reduced and decomposition of the electrolyte may be further suppressed. In addition, it is thought that deformation or breakage of particles is less likely to occur due to pressurization during the manufacture of a negative electrode, and pathways through which an electrolyte can flow are readily secured among the particles.

The lower limit of the particle size distribution D90/D10 of flat graphite particles is not particularly limited, or may be, for example, 2.0 or more.

The particle size distribution D90/D10 of flat graphite particles may be calculated by either one of the following methods.

A particle size distribution (D90/D10) obtained by a volume-based particle size distribution may be regarded as the particle size distribution (D90/D10) of a flat-shaped graphitizable material used as the raw material of the specific composite particles. The particle size distribution (D90/D10) is obtained by a laser-diffraction particle size analyzer (for example, SALD3100, Shimadzu Corporation).

A particle size distribution (D90/D10) may be calculated as a ratio of a particle size (D90) at which an accumulated number in arbitrarily selected 1000 particles from a side of smaller size is 90%, to a particle size (D10) at which an accumulated number in arbitrarily selected 1000 particles from a side of smaller size is 10%, and regarded as the particle size distribution of flat graphite particles. The measurement is conducted by observing a cross-section of specific composite particles with a scanning electron microscope, and an equivalent circle diameter, which is a diameter of a circle having an equivalent area to a projected area of an object, is regarded as the particle size of each particle.

The flat graphite particles preferably has an aspect ratio of, for example, from 2 to 20, more preferably from 4 to 10. The aspect ratio refers to a value of A/B, in which A is a length in a major-axis direction of an object and B is a length in a minor-axis direction of an object.

When the aspect ratio of flat graphite particles is 2 or more, an outer surface area of the particles is increased and a buoyant force of the particles is relatively large. Therefore, the particles tend to aggregate in order to reduce their buoyant force. In a process of aggregation, the particles are layered such that their planes in a major-axis direction face to each other in order to minimize the outer surface area, thereby maximizing an area at which the particles are in contact with each other. In combination of an effect of a van der Waals's force acting among the particles, a strong and stable aggregate is formed by the particles.

When the aspect ratio of the flat graphite particles is 20 or less, input/output characteristics, such as rapid discharge characteristics, of a lithium ion secondary battery tend to improve. Further, the particles tend to have a reduced thickness and the number of particles constituting a layered configuration tends to increase. As a result, the layered configuration tends to have an increased specific surface area as a result of an increased amount of spaces between the particles, thereby suppressing the reduction in storage characteristics of a lithium ion secondary battery.

The aspect ratio (A/B) of the flat graphite particles is an arithmetic value of aspect ratios of arbitrarily selected 100 particles observed in an electron micrograph.

In the observation, a maximum value of a distance between a pair of parallel external tangent lines a1 and a2, with respect to a projection image of a particle, is regarded as the length in a major-axis direction A of the particle. A minimum value of a distance between a pair of parallel external tangent lines b1 and b2, with respect to a projection image of a particle, is regarded as the length in a minor-axis direction B of the particle.

When the graphite particles include specific composite particles, all of the graphite particles may be specific composite particles or a part of the graphite particles may be specific composite particles.

When the graphite particles is a mixture of specific composite particles and particles other than specific composite particles, a ratio of the specific composite particles with respect to a total amount of graphite particles may by 50% by mass or more, 60% by mass or more, 70% by mass or more, 80% by mass or more, or 90% by mass or more.

The ratio of specific composite particles with respect to a total amount of graphite particles may be 95% by mass or less.

Graphite particles may be in a state in which low-crystalline carbon is disposed at at least a portion of a surface thereof. When low-crystalline carbon is disposed at at least a portion of a surface of graphite particles, charging characteristics of a lithium ion secondary battery in a low-temperature environment tends to improve.

Graphite particles may be in a state in which low-crystalline carbon is not disposed at a surface thereof. When low-crystalline carbon is not disposed at a surface of graphite particles, cracking or separation of graphite particles due to pressurization during the manufacture of an electrode is less likely to occur, thereby suppressing a reduction in storage characteristics due to an increased decomposition activity of an electrolyte. Another advantageous aspect of not having low-crystalline carbon on a surface of graphite particles is to broaden a range of freedom in manufacturing conditions.

It is proved that the graphite particles of the present disclosure tend to exhibit excellent rapid input/output characteristics even when low-crystalline carbon is not disposed on a surface thereof. The reason for this is thought to be that the properties of the particles, such as hardness, elasticity or the like, have greater effects on the rapid input/output characteristics, as compared with a surface structure of the particles.

In the present disclosure, the low-crystalline carbon refers to a carbon having an R value in Raman spectrum of 0.2 or more.

The R value in Raman spectrum is a ratio of intensity (Id/Ig), in which Id is an intensity of a maximum peak that appears approximately at 1360 $cm^{-1}$ and Ig is an intensity of a maximum peak that appears approximately at 1580 $cm^{-1}$, in laser Raman spectrometry.

Generally, a peak that appears approximately at 1360 $cm^{-1}$ is identified as an amorphous structure of carbon, and refers to a peak that appears at a range of from 1300 $cm^{-1}$ to 1400 $cm^{-1}$. A peak that appears approximately at 1580 $cm^{-1}$ is identified as a graphite-crystal structure, and refers to a peak that appears at a range of from 1530 $cm^{-1}$ to 1630 $cm^{-1}$.

The measurement of R value is conducted under the following conditions using a Raman spectrometer (for example, XploRA PLUS, Horiba, Ltd.) with a baseline of the following ranges.

Laser wavelength: 532 nm
Laser intensity: 100 mW or more
ND filter: 1%
Irradiation intensity: 1 mW
Measurement range: 1000 $cm^{-1}$ to 1800 $cm^{-1}$
Irradiation time: 30 seconds
Irradiation area: 1 $\mu m^2$
Base line (D band): 1100 $cm^{-1}$ to 1470 $cm^{-1}$
Base line (G band): 1450 $cm^{-1}$ to 1710 $cm^{-1}$
Cumulated number per particle: 2
Number of particles for measurement: 30 particles (Average Particle Size)

From the viewpoint of improving the permeability of an electrolyte, the average particle size of graphite particles is preferably, for example, from 5 μm to 30 μm, more preferably from 8 μm to 25 μm, further preferably from 10 μm to 20 μm.

The average particle size of graphite particles may be measured using a laser diffraction particle size distribution analyzer (for example, SALD3100, Shimadzu Corporation). In a volume-based particle size distribution, a value at which an accumulation from a side of smaller size is 50% (D50) is regarded as the average particle size of graphite particles.

The average particle size of graphite particles included in a negative electrode may be measured by embedding an electrode in an epoxy resin, and observing a cross-section of the electrode with a scanning electron microscope (for example, VE-7800, Keyence Corporation). The cross-section of the electrode may be obtained by performing mirror polishing or using an ion milling apparatus (for example, E-3500, Hitachi High-Technologies Corporation).

In the measurement, a median value of particle sizes of arbitrarily selected 100 particles is regarded as the average particle size.

(Particle Size Distribution D90/D10)

The particle size distribution D90/D10 of graphite particles is preferably 5.0 or less, more preferably 4.0 or less, further preferably 3.0 or less. When the particle size distribution D90/D10 of graphite particles is 5.0 or less, it is thought that pathways for an electrolyte are maintained in a favorable manner, and infusion properties of an electrolyte is maintained in a favorable manner.

The lower limit of the particle size distribution D90/D10 of graphite particles is not particularly limited, or may be, for example, 2.0 or more.

The particle size distribution D90/D10 of graphite particles may be measured using a laser diffraction particle size distribution analyzer (for example, SALD3100, Shimadzu Corporation).

The particle size distribution of graphite particles included in a negative electrode may be measured by embedding an electrode in an epoxy resin, and observing a cross-section of the electrode with a scanning electron microscope (for example, VE-7800, Keyence Corporation). The cross-section of the electrode may be obtained by performing mirror polishing or using an ion milling apparatus (for example, E-3500, Hitachi High-Technologies Corporation).

In the above-noted measurement, the particle size distribution D90/D10 may be measured by the following method.

(1) An area of a projected image of particle Sn (n is a specific number given to a selected particle) is calculated by binarization.

(2) An equivalent circle diameter $Ln=\sqrt{Sn/\pi}$ is calculated from Sn, on the assumption that the particle has a shape of true sphere.

(3) A volume of a sphere $Vn=(4/3)\pi(Ln)^3$ is calculated from Ln.

(4) Processes (1) to (3) are conducted on arbitrarily selected 100 particles.

(5) A distribution curve, in which a longitudinal axis represents a cumulative volume of 100 particles (%) and a lateral axis represents a particle size, is obtained. A value of D90/D10 is calculated from a particles size at which a cumulative volume is 10% (D10) and a particles size at which a cumulative volume is 90% (D90).

(Standard Deviation of Particle Size Distribution)

The standard deviation of a particle size distribution of graphite particles is preferably 0.30 or less, more preferably 0.25 or less, further preferably 0.20 or less. When the standard deviation of a particle size distribution of graphite particles is 0.30 or less, it is thought that pathways for an electrolyte are maintained in a favorable manner, and infusion properties for an electrolyte is maintained in a favorable manner. The lower limit of the standard deviation of a particle size distribution of graphite particles is not particularly limited.

The standard deviation of a particle size distribution of graphite particles may be measured with a laser diffraction particle size distribution analyzer (for example, SALD3100, Shimadzu Corporation) based on a frequency distribution histogram, in which a lateral axis represents a logarithmic particle size and a longitudinal axis represents an amount of particles (%).

(Spring-Back Ratio)

From the viewpoint of suppressing the deformation or breakage of graphite particles due to pressurization during the manufacture of a negative electrode, the spring-back ratio of graphite particles is preferably 25% or more, more preferably 27% or more, further preferably 30% or more.

From the viewpoint of readily increasing the density of a negative electrode by pressurization during the manufacture of a negative electrode, the spring-back ratio of graphite particles may be 50% or less, 45% or less, or 40% or less.

In the present disclosure, the spring-back ratio of graphite particles refers to a degree of reduction in density of graphite particles, upon removal of pressure from graphite particles that have been pressurized to a standard density. The greater the spring back ratio is, the more likely it is that the graphite particles, being deformed due to pressurization, return to an original state.

Specifically, a specific mass (for example, 3.0 g) of graphite particles is loaded into a mold, and the graphite particles are pressurized at a constant rate (for example, 10 mm/min) until the density of the graphite particles reaches a standard density (for example, 1.8 g/cm$^3$). Subsequently, pressure is removed, and a density of the graphite particles after removal of pressure (density after removal of pressure) is measured. The density after removal of pressure is measured when a pressurized plane of the graphite particles stops moving due to elasticity. The spring-back ratio is calculated from the following equation.

$$\text{Spring-back ratio (\%)}=\{(\text{standard density}-\text{density after removal of pressure})/\text{standard density}\}\times 100$$

In the measurement, a mold having a diameter of 15 mm is used and the pressurization is performed using an autograph (a product from Shimadzu Corporation, for example). The density of graphite particles is calculated from a volume and a mass of graphite particles. The volume of graphite particles is calculated from a base area of the mold (for example, 1.767 cm$^2$) and a distance between the base of the mold and a pressurized plane of graphite particles.

(Oil Absorption)

The oil absorption of graphite particles is preferably from 10 mL/100 g to 60 mL/100 g, more preferably from 15 mL/100 g to 45 mL/100 g, further preferably from 20 mL/100 g to 40 mL/100 g.

The oil absorption of graphite particles is an indicator of an amount of pores that are present inside or on a surface of the particles, and an amount of spaces among the particles.

When the oil absorption of graphite particles is 60 mL/100 g or less, it is thought that the amount of pores that are present inside or on a surface of the particles is small, and an area of the particles to be in contact with an electrolyte is sufficiently small. In addition, since the particles have a small interface, it is possible to reduce the amount of a binder used in the manufacture of a negative electrode, thereby reducing electric resistance and improve the battery performances. In addition, since the amount of pores is small, it is possible to reduce the amount of a solvent to be removed during a drying process, thereby reducing the production cost (such as drying apparatus and energy) and reducing the effects on the environment.

When the oil absorption of graphite particles is 10 mL/100 g or more, it is thought that an increase in viscosity of a slurry prepared by mixing the graphite particles with other components such as a binder, which occurs when an amount of spaces among the particles is too small, tends to be suppressed. In addition, a binder spreads in a favorable manner and mixing is readily performed during the preparation of a slurry. In addition, spaces among the particles through which lithium ions can migrate are readily secured.

In the present disclosure, the oil absorption of graphite particles is measured by a method described in JIS K6217-4:2017 "Carbon Black for Rubber—Standard Properties—Section 4: Measurement of Oil Absorption", using linseed oil (a product from Kanto Kagaku, for example) instead of dibutyl phthalate (DBP).

Specifically, while dropping linseed oil onto a sample powder with a constant-rate buret, a change in viscosity characteristics is measured using a torque detector. The amount of linseed oil added per unit mass of a sample powder, at a torque corresponding to 70% of a maximum torque, is regarded as the oil absorption (mL/100 g). The measurement may be performed by using a measurement apparatus from Asahi Souken Corporation (trade name: S-500), for example.

(Peak Intensity Ratio in Rhombohedral Structure)

The peak intensity ratio in rhombohedral structure of graphite particles may be 0.15 or less, 0.10 or less, or 0.05 or less. The peak intensity ratio in rhombohedral structure of graphite particles is represented by P1/P2, in which P1 is a diffraction peak at a (101) plane of a rhombohedral structure and P2 is a diffraction peak at a (101) plane of a hexagonal structure, in an X-ray diffraction pattern using CuKα rays.

The peak intensity ratio (P1/P2) is preferably within a range in which peaks are not detected by the following method.

When the peak intensity ratio in rhombohedral structure of graphite particles is 0.15 or less, it is thought that the graphite particles have a high degree of graphitization, and tend to achieve a high degree of charge/discharge capacity.

The peak intensity ratio in rhombohedral structure of graphite particles is calculated from an intensity ratio of a diffraction line of a rhombohedral structure (P1: diffraction angle 43.2°) and a diffraction line of a hexagonal structure (P2: diffraction angle 44.3°) in an X-ray diffraction pattern using CuKα rays. The diffraction angle is expressed by 2θ (θ is a Bragg's angle). A diffraction line of a (101) plane of a rhombohedral structure appears at a diffraction angle of 43.2°, and a diffraction line of a (101) plane of a hexagonal structure appears at a diffraction angle of 44.30.

(Degree of Graphitization)

The degree of graphitization of graphite particles, obtained by X-ray diffraction, may be from 93.0% to 100.0%, from 93.5% to 99.0%, or from 94.0% to 98.0%.

For example, when the degree of graphitization of graphite particles having a relatively large particle size such as over 12 μm, the graphite particles have a sufficient degree of hardness and less prone to deformation or breakage. When a high degree of graphitization of graphite particles is desired, it is possible to achieve a sufficient degree of hardness by reducing a particle size to less than 10 μm. For example, it is possible to maintain a shape of graphite particles by reducing the particle size while having a degree of graphitization of 100%.

When a degree of graphitization of graphite particles is 93.0% or more, an excellent discharge capacity tends to be achieved.

The degree of graphitization of graphite particles may be measured by the following method.

60 parts by mass of graphite particles and 40 parts by mass of silicon powder (for example, a product from Fujifilm Wako Pure Chemical Corporation, degree of purity: 99.9%) are mixed in an agate mortar for 5 minutes. The mixture is loaded into a cell of an X-ray diffractometer (for example, MultiFlex from Rigaku Corporation), and a diffraction angle corresponding to a (002) plane of graphite and a diffraction angle corresponding to a (111) plane of silicon are measured using CuKα rays (2θ=25° to 29°).

The diffraction angles obtained in the measurement are corrected using a theoretical diffraction angle of Si (2θ=28.442°), thereby obtaining a correct diffraction angle of graphite.

An interplanar spacing (Å) at a d(002) plane is calculated using a Bragg's equation (2d sin θ=nλ), and a degree of graphitization is obtained by the following equation.

$$\text{Degree of graphitization}=[(3.44-\text{interplanar spacing})/(0.086)]\times 100$$

The method for manufacturing a negative electrode material includes graphitizing a coke that satisfies the following (1) and (2):

(1) having a thermal expansion coefficient of $2.9\times10^{-6}$/° C. or less after calcination at 1400° C.; and (2) having a Hardgrove Grindability Index (HGI) of 47 or less after calcination at 1200° C.

A lithium ion secondary battery using, as a negative electrode material, graphite particles obtained by graphitizing a coke satisfying the above-noted conditions, exhibit excellent high-temperature resistance and excellent rapid-charging characteristics. While the reason for this remains somewhat unclear, it is thought to be as follows.

By using a coke that satisfies (1) having a thermal expansion coefficient of $2.9\times10^{-6}$/° C. or less after calcination at 1400° C., occurrence of cracking due to expansion of coke particles and contraction of coke particles due to crystallization, during graphitization, are suppressed. Graphite particles obtained by graphitizing coke particles satisfying (1) have a relatively small area to be in contact with an electrolyte and decomposition thereof is suppressed. Therefore, degradation of a battery in a high-temperature environment is suppressed.

By using a coke that satisfies (2) having a Hardgrove Grindability Index (HGI) of 47 or less after calcination at 1200° C., relatively hard graphite particles are obtained. Therefore, deformation or breakage of graphite particles is less likely to occur and a sufficient amount of spaces through which an electrolyte can flow is secured among the particles. Therefore, it is possible to adapt a lithium ion secondary battery to rapid charging.

(1) Thermal Expansion Coefficient

The thermal expansion coefficient (CTE) of a coke after calcination at 1400° C. is $2.9\times10^{-6}$/° C. or less.

The thermal expansion coefficient of a coke depends on the amount of closed pores that are present inside the coke. The less the thermal expansion coefficient is, the less the amount of closed pores tends to be.

When the coke has a small thermal expansion coefficient, it is thought that the coke has a small degree of expansion/contraction, and graphite particles obtained from the coke particles have a small area to be in contact with an electrolyte.

The thermal expansion coefficient of a coke after calcination at 1400° C. is preferably $2.7\times10^{-6}$/° C. or less, more preferably $2.5\times10^{-6}$/° C. or less, further preferably $2.3\times10^{-6}$/° C. or less.

From the viewpoint of obtaining graphite particles having a moderate amount of pores, the thermal expansion coefficient of a coke after calcination at 1400° C. is preferably $1.0\times10^{-6}$/° C. or more.

Examples of the method for obtaining a coke having a thermal expansion coefficient of $2.9\times10^{-6}$/° C. or less after calcination at 1400° C. include a method of converting the closed pores inside the coke particles to open pores. Specifically, it is possible to covert the closed pores to open pores by pulverizing coarse particles using a pulverizer such as a roller mill.

The thermal expansion coefficient of a coke is measured by the following method.

A mixture is obtained by mixing 70 g of a coke after calcination at 1400° C. and 30 g of a binder pitch for 5 minutes. A sample is obtained by adding 15 g of distilled oil, which is liquid at room temperature, to 100 g of the mixture, and mixing the same for 3 minutes with a planetary mixer. A molded product is obtained from the sample by pressurizing the same at 10 MPa for 30 minutes. The temperature of the molded product is increased from room temperature (25° C.) to 1000° C. over 5 hours in a nitrogen atmosphere, and the temperature is retained at 1000° C. for 1 hour. A calcined product is obtained by cooling the molded product. A test piece is obtained by cutting the calcined product into a size of 5.0 mm×5.0 mm×15.0 mm with a precision cutting machine. The test piece is used for the measurement of thermal expansion using a TMA (thermomechanical analyzer, for example, a product from Hitachi High-Tech Corporation) within a temperature range of from 30° C. to 500° C., and calculating a value of CTE from the measurement results.

(2) Hardgrove Grindability Index

The hardgrove grindability index (HGI) of a coke used in the method of manufacture is 47 or less after calcination at 1200° C.

The hardgrove grindability index of a coke indicates a degree of pulverizability of a coke. The less the hardgrove grindability index of a coke is, the more the coke is hard and the less likely it is the coke is pulverized. Therefore, graphite particles obtained from the coke tends to be hard.

The hardgrove grindability index of a coke is preferably 44 or less, more preferably 40 or less.

From the viewpoint of increasing the density of a negative electrode using graphite particles, the hardgrove grindability index of a coke may be 20 or more.

The hardgrove grindability index of a coke is measured according to JIS M 8801 (2004).

It is noted that a coke that has not been calcined (green coke) and a coke that has been calcined (calcined coke) have different values of hardgrove grindability index. The hardgrove grindability index of a calcined coke is more suitable for the evaluation of an effect of a bulk density on the hardness.

The coke used in the method of manufacture preferably satisfies at least one of the following (3), (4) or (5):

(3) having a butanol absolute specific gravity of 2.05 or more after calcination at 1200° C.;

(4) having a pore volume of 0.90 mL/g or less; or (5) having a pore specific surface area of 3.0 $m^2$/g or less.

(3) Butanol Absolute Specific Gravity

The butanol absolute specific gravity of a coke indicates an amount of closed pores that are present inside the coke. The greater the butanol absolute specific gravity of a coke is, the less the amount of closed pores inside the coke tends to be.

When the coke has a large butanol absolute specific gravity, it is thought that a degree of occurrence of cracking in coke particles during graphitization is small, and graphite particles obtained from the coke particles have a small area to be in contact with an electrolyte.

From the viewpoint of reducing an area of graphite particles to be in contact with an electrolyte, the butanol absolute specific gravity of a coke after calcination at 1200° C. is preferably 2.05 or more, more preferably 2.10 or more, further preferably 2.12 or more.

From the viewpoint of securing a moderate amount of area of graphite particles to be in contact with an electrolyte, the butanol absolute specific gravity of a coke after calcination at 1200° C. may be 2.20 or less.

It is noted that a coke that has not been calcined (green coke) and a coke that has been calcined (calcined coke) have different values of butanol absolute specific gravity. The butanol absolute specific gravity of a calcined coke is more suitable for the evaluation of the absolute specific gravity, because a calcined coke is impregnated with butanol more smoothly than a green coke.

The butanol absolute specific gravity of a coke is measured by a pycnometer method using butanol.

(4) Pore Volume

The pore volume of a coke indicates an amount of open pores that are present in the coke. The less the pore volume of a coke is, the less the amount of open pores in the coke tends to be. Therefore, it is thought that an area of graphite particles to be in contact with an electrolyte can be reduced by selecting a coke having a small pore volume as a raw material.

From the viewpoint of reducing an area of graphite particles to be in contact with an electrolyte, the pore volume of the coke is preferably 0.90 mL/g or less, more preferably 0.85 mL/g or less, further preferably 0.80 mL/g or less.

From the viewpoint of securing a moderate amount of area of graphite particles to be in contact with an electrolyte, the pore volume of a coke may be 0.50 mL/g or more.

The pore volume of a coke is measured by a mercury intrusion method.

Specifically, the pore volume of a sample of approximately from 0.2 g to 0.3 g is measured using a pore distribution analyzer (for example, AutoPore V 9620, Shimadzu-Micromeritics) at an initial pressure of 9 kPa (approximately 1.3 psia, corresponding pore diameter: approximately 140 μm). The contact angle and the surface tension of mercury are given as 130.0° and 485.0 dynes/cm. The pore volume is calculated in a pore diameter range of from 0.003 μm to 3.5 μm.

(5) Pore Specific Surface Area

The pore specific surface area of a coke indicates an amount of open pores that are present in the coke. The less the pore specific surface area of a coke is, the less the amount of open pores in the coke tends to be. Therefore, it is thought that an area of graphite particles to be in contact with an electrolyte can be reduced by selecting a coke having a small pore specific surface area as a raw material.

From the viewpoint of reducing an area of graphite particles to be in contact with an electrolyte, the pore specific surface area of the coke is preferably 3.0 $m^2/g$ or less, more preferably 2.5 $m^2/g$ or less, further preferably 2.0 $m^2/g$ or less.

From the viewpoint of securing a moderate amount of area of graphite particles to be in contact with an electrolyte, the pore specific surface area of a coke may be 0.5 $m^2/g$ or more.

The pore specific surface area of a coke is measured by a mercury intrusion method.

Specifically, the pore specific surface area of a sample of approximately from 0.2 g to 0.3 g is measured using a pore distribution analyzer (for example, AutoPore V 9620, Shimadzu-Micromeritics) at an initial pressure of 9 kPa (approximately 1.3 psia, corresponding pore diameter: approximately 140 μm). The contact angle and the surface tension of mercury are given as 130.0° and 485.0 dynes/cm. The pore volume is calculated in a pore diameter range of from 0.003 μm to 3.5 μm.

The type of the coke used in the present method of manufacture is not particularly limited, and examples include petroleum-based or coal-based cokes such as fluid cokes, needle cokes, mosaic cokes, and semi-needle cokes having an intermediary property between needle cokes and mosaic cokes.

Among these cokes, needle cokes and semi-needle cokes are preferred because these cokes tend to have a small thermal expansion coefficient. Further, since needle cokes and semi-needle cokes have a high degree of crystallinity, particles of a flat shape tend to be obtained. Since needle cokes have a high degree of crystallinity and a large particle size, it is easier to adjust the particle size by disintegration and classification. The coke may be used singly or in combination of two or more kinds. A needle coke and a semi-needle coke may be used in combination, as long as the above-noted conditions are satisfied.

The method for obtaining particles of coke (coke particles) is not particularly limited, and may be performed by a known method. The particle size of coke particles is not particularly limited, and may be selected in view of the size, structure or the like of the desired graphite particles.

The present method of manufacture may be a method for manufacturing the negative electrode material according to the present disclosure. In such a case, details of the negative electrode material as mentioned above may be applied to the present method of manufacture.

The graphite particles manufactured by the present method may be in a state in which plural graphite particles are aggregated or joined (composite particles) or in a state of composite particles in which plural flat graphite particles are layered (specific composite particles).

For example, graphite particles being in a state of specific composite particles may be produced by a method including obtaining a mixture of coke particles having a flat shape with a binder; obtaining secondary particles in which flat coke particles are layered from the mixture; and graphitizing the secondary particles.

In a preferred embodiment, the method for manufacturing a negative electrode material includes:

- obtaining a mixture by mixing flat coke particles with a binder;
- processing the mixture to obtain secondary particles having a configuration in which the flat coke particles are layered; and
- obtaining composite particles having a configuration in which flat graphite particles are layered (specific composite particles) by graphitizing the secondary particles.

When specific composite particles are manufactured, the method may include removing, from the flat coke particles, at least one selected from the group consisting of fine particles and coarse particles by classification. By subjecting the coke particles to classification, specific composite particles having a densely layered structure and a reduced specific surface area tend to be obtained.

When specific composite particles are manufactured, the method may include removing, from the specific composite particles, at least one selected from the group consisting of fine particles and coarse particles by classification. By subjecting the specific composite particles to classification, deviation in particle size is suppressed and pathways for an electrolyte tends to be maintained in a favorable manner.

Accordingly, in a preferred embodiment, the method for manufacturing a negative electrode material includes:

(a) optionally removing, from flat coke particles, at least one selected from the group consisting of fine particles and coarse particles by classification;

(b) obtaining a mixture by mixing flat coke particles with a binder;

(c) processing the mixture to obtain secondary particles having a configuration in which the flat coke particles are layered;

(d) graphitizing the secondary particles to obtain composite particles having a configuration in which flat graphite particles are layered (specific composite particles); and (e) optionally removing, from the specific composite particles, at least one selected from the group consisting of fine particles and coarse particles by classification.

In the present disclosure, the fine particles refer to particles having a smaller particle size than the particles to be collected by classification, and the coarse particles refer to particles having a greater particle size than the particles to be collected by classification.

In the following, each of (a) to (e) that may be included in the present method are explained.

(a) Removing, from Flat Coke Particles, at Least One Selected from the Group Consisting of Fine Particles and Coarse Particles by Classification Flat coke particles may be subjected to classification to remove at least one selected from the group consisting of fine particles and coarse particles, prior to the formation of composite particles.

The classification may be performed such that the flat coke particles have a particle distribution D90/D10 of from 2.0 to 4.4, preferably from 2.0 to 4.0, more preferably from 2.0 to 3.5, for example.

The classification is preferably performed to remove fine particles having a particle size of 1 μm or less, more preferably 2 μm or less, further preferably 3 μm or less, for example.

The classification is preferably performed to remove coarse particles having a particle size of 60 μm or mores, more preferably 50 μm or more, further preferably 40 μm or more, for example. It is possible to disintegrate the removed coarse particles and reuse the same as a raw material.

The method for classification is not particularly limited, and examples thereof include sieving, airflow centrifugal classification, and precise airflow centrifugal classification employing a coanda effect. The classification may be performed by pulverizing coarse particles by intensively applying pressure with a roll mill.

(b) Obtaining a Mixture by Mixing Flat Coke Particles with a Binder

In the present process, a binder having an ability to graphitize is used. Examples of the binder includes pitches and tars, which may be coal-based, petroleum-based or artificial, thermoplastic resins, and thermosetting resins. A binder having a low viscosity is preferably used in order for the flat coke particles to have a high degree of flowability during mixing.

As necessary, the mixture may be added with a graphitization catalyst, a flowability-imparting agent, and the like.

Examples of the graphitization catalyst include a substance having an ability to catalyze graphitization such as silicon, iron, nickel, titanium, boron, vanadium and aluminum, carbides of these substances, oxides of these substances, nitrides of these substances, and micaceous clay minerals.

The amount of a graphitization catalyst is not particularly limited, as long as a desired product is obtained. From the viewpoint of avoiding excessive graphitization, it is preferred to reduce the amount of a graphitization catalyst or not to use a graphitization catalyst. For example, when silicon carbide (SiC) is used as a graphitization catalyst, the amount thereof is preferably 5% by mass or less, more preferably 3% by mass or less, further preferably 1% by mass or less, with respect to the mass of a graphitizable material.

The method for the mixing is not particularly limited. From the viewpoint of reducing the amount of pores in secondary particles, the mixing is preferably performed by a method in which application of shear force can be minimized, for example, using a kiln-type mixer or a huddle-type mixer, rather than using a kneader or the like.

(c) Processing the Mixture to Obtain Secondary Particles Having a Configuration in which Flat Coke Particles are Layered The method for processing the mixture is not particularly limited. In an embodiment, the mixture may be processed by heating the same to evaporate a volatile component such as a binder. The temperature for heating is preferably 400° C. or less. When the temperature for heating is 400° C. or less, secondary particles are less prone to formation of fine pores due to oxidation combustion, thereby having a small specific surface area. From the viewpoint of facilitating granulation, the heating may be performed while allowing the mixture to flow using a stirrer or the like.

The heating may be performed under reduced pressure. By performing the heating under reduced pressure, impregnation of coke particles with a binder to fill spaces among the particles is facilitated, and secondary particles having a layered structure with a small amount of internal pores tend to be obtained.

In the following, a specific example of a method for manufacturing secondary particles is explained.

A mixture of coke particles and a binder is stirred at a temperature range higher than a melting point of the binder, preferably at which volatile components are removed, until volatile components are removed. By slowly performing deaeration, occurrence of air bubbles while crystals are calcined is suppressed, thereby obtaining particles having a small amount of pores inside or at a surface thereof, i.e., particles that is hard, having a small specific surface area, and exhibiting excellent high-temperature resistance. From the viewpoint of safety, it is preferred to introduce an inert gas into a mixer to suppress the oxygen concentration to be 15% or less in order to inhibit ignition of a volatized gas. From the viewpoint of obtaining particles having a small specific surface area, the temperature in the mixer is preferably 400° C. or less in order to suppress the formation of pores due to oxidation combustion. When pitch is used as a binder, the pitch may be made infusible by allowing the same to uptake oxygen in an atmosphere. In such a case, growth of crystals during graphitization is promoted, and highly densified crystals may be obtained. Meanwhile, it becomes more likely to create irregularities due to oxidation. Therefore, the amount of uptake of oxygen needs to be adjusted in view of a specific surface area, hardness or the like.

In view of enhancing the above-noted effects, it is preferred to perform deaeration, infusibilization and depressurization in an environment in which a binder is in a flowable state of either a liquid or a gas.

(d) Graphitizing Secondary Particles to Obtain Composite Particles Having a Configuration in which Flat Graphite Particles are Layered (Specific Composite Particles)

In the present process, secondary particles are graphitized. Specifically, a graphitizable component included in the secondary particles is graphitized. The graphitization is preferably performed in an environment in which a mixture is less likely to be oxidized, such as nitrogen or argon gas. The temperature for the graphitization is not particularly limited, as long as a graphitizable component is graphitized, and may be, for example, 2000° C. or more, 2500° C. or more, 2800° C. or more, or 3000° C. or more. The upper limit of the temperature is not particularly limited as long as graphite is not sublimated, and may be 3200° C. or less, for example. When the temperature is 2000° C. or more, changes in crystals occur. When the temperature is 2500° C. or more, growth of graphite crystals is promoted. When the temperature is 2800° C. or more, graphite crystals having a high capacity to store a large amount of lithium ions tend to obtained, and an amount of a residual component, i.e., a graphitization catalyst that remains after graphitization, can be reduced. When the temperature is 3200° C. or less, sublimation of part of graphite may be suppressed.

In the present process, a degree of graphitization may be adjusted to be 98.0% or less, preferably 97.0% or less, more preferably 96.0% or less.

The method for manufacturing a negative electrode material may include a process of forming the secondary particles into a block or the like, prior to the graphitization. By forming the secondary particles, it is possible to increase the bulk density of the secondary particles and increase the amount thereof to be loaded into a graphitization furnace. As a result, graphitization can be performed in a more energy-saving manner. The secondary particles may be formed by any method. For example, the secondary particles may be formed by a process of loading the same into a container made of metal or the like, and pressurizing the same.

The method for manufacturing a negative electrode material may not include a process of forming the secondary particles into a block or the like, prior to the graphitization (namely, the method may not include a process of disintegrating a formed product of secondary particles). In such a case, it is possible to suppress an increase in the amount of rhombohedral crystals during the formation and disintegration of the secondary particles, and improve the high-temperature resistance in a more favorable manner.

The bulk density of the secondary particles prior to the graphitization is preferably from 0.4 g/cm$^3$ to 1.2 g/cm$^3$, more preferably from 0.6 g/cm$^3$ to 1.1 g/cm$^3$, further preferably from 0.8 g/cm$^3$ to 1.0 g/cm$^3$. When the bulk density of the secondary particles prior to the graphitization is 0.4 g/cm$^3$ or more, the amount of spaces inside the particles is relatively small, and it is possible to obtain composite particles having a high density. When the bulk density of the secondary particles prior to the graphitization is 1.0 g/cm$^3$ or less, it is possible to omit a process of disintegration after the graphitization, or to reduce the amount of force for disintegration after the graphitization, thereby suppressing an increase in the amount of rhombohedral crystals.

In the present disclosure, the bulk density of particles is measured by a weight measurement method. Namely, the bulk density of particles is obtained by dividing the mass of the particles measured in the air by the bulk volume of the particles. The mass of particles refers to a total mass of components other than a graphitization catalyst (for example, when the particles includes a graphitizable material, a binder, and a graphitization catalyst, a total mass of a graphitizable material and a binder except for volatile components).

(e) Removing, from Composite Particles, at Least One Selected from the Group Consisting of Fine Particles and Coarse Particles by Classification The composite material obtained by graphitization may be classified to remove at least one selected from the group consisting of fine particles and coarse particles. By performing the classification, it is thought that unevenness in particle size of the composite particles is suppressed and pathways for an electrolyte may be maintained in a favorable manner.

The classification may be performed such that the composite particles have a particle size distribution D90/D10 of from 2.0 to 5.0, preferably from 2.0 to 4.0, more preferably from 2.0 to 3.0.

The method for the classification is not particularly limited, and examples thereof include sieving, airflow centrifugal classification, and precise airflow centrifugal classification making use of a coanda effect. The classification may be performed by pulverizing coarse particles by intensively applying pressure with a roll mill.

When the classification is performed to remove fine particles, the particle size of fine particles to be removed is preferably 1 μm or less, more preferably 2 μm or less, further preferably 3 μm or less.

When the classification is performed to remove coarse particles, the particle size of coarse particles to be removed is preferably 60 μm or more, more preferably 50 μm or more, further preferably 40 μm or more.

Other Processes

The present method for manufacturing a negative electrode material may include a process other than the processes as mentioned above.

For example, the method may include attaching an organic compound to a surface of the secondary particles and subjecting the same to a thermal treatment, after the graphitization. By attaching an organic compound to a surface of the secondary particles and subjecting the same to a thermal treatment, in which the organic compound turns to a low-crystalline carbon, composite particles with a low-crystalline carbon that is disposed at least a portion of a surface of the composite particles are obtained.

The method for attaching an organic compound to a surface of the secondary particles is not particularly limited. For example, the attachment may be performed by a wet method that includes dispersing the secondary particles in a solution including an organic compound and a solvent in which the organic compound is dissolved or dispersed, and then removing the solvent; or a dry method that includes applying a physical force to a mixture including the secondary particles and an organic compound.

The organic compound is not particularly limited, as long as it turns to a low-crystalline carbon by a thermal treatment (carbon precursor). Examples of the organic compound include petroleum-based pitch, naphthalene, anthracene, phenanthroline, coal tar, phenol resin and polyvinyl alcohol. The organic compound may be used singly or in combination of two or more kinds.

The temperature for the thermal treatment is not particularly limited, as long as an organic compound that is attached to a surface of the second particles turns to a low-crystalline carbon. The temperature is preferably, for example, from 400° C. to 1500° C. From the viewpoint of further improving the high-temperature resistance, the temperature is more preferably from 1000° C. to 1500° C. The thermal treatment is preferably performed in an inert gas atmosphere such as a nitrogen atmosphere.

<Lithium-Ion Secondary-Battery Negative Electrode>

The lithium-ion secondary-battery negative electrode according to the present disclosure includes a negative electrode material layer, which includes the lithium-ion secondary-battery negative electrode material according to the present disclosure, and a current collector. The lithium-ion secondary-battery negative electrode may include a component other than the negative electrode material layer and the current collector, as necessary.

The lithium-ion secondary-battery negative electrode may be prepared by, for example, a method including preparing a slurry-like composition by mixing the lithium-ion secondary-battery negative electrode material with a binder and a solvent, and applying the composition onto a current collector; or a method including forming the composition into a shape of a sheet or a pellet, and integrating the same with a current collector. The mixing may be performed with a disper mixer, a planetary mixer, or the like.

The binder used for the preparation of a composition for a lithium-ion secondary-battery negative electrode is not particularly limited, and examples thereof include polymer compounds having a high degree of ion conductivity, such as styrene-butadiene copolymer (SBR); a homopolymer or a copolymer of an ethylenic-unsaturated carboxylic acid ester such as methyl acrylate, methyl methacrylate, ethyl acrylate, ethyl methacrylate, butyl acrylate, butyl methacrylate, hydroxyethyl acrylate or hydroxyethyl methacrylate, or an ethylenic-unsaturated carboxylic acid such as acrylic acid, methacrylic acid, itaconic acid, fumaric acid and maleic acid; polyvinylidene fluoride; polyethylene oxide; polyepichlorohydrin; polyphosphazene; polyacrylonitrile; and polymethacrylonitrile.

When the composition includes a binder, the amount thereof is not particularly limited. For example, the amount of a binder may be from 0.5 parts by mass to 20 parts by mass with respect to 100 parts by mass of a total of the lithium-ion secondary-battery negative electrode material and the binder.

The composition for a lithium-ion secondary-battery negative electrode may include a thickening agent. Examples of the thickening agent include carboxymethylcellulose, methylcellulose, hydroxymethylcellulose, ethylcellulose, polyvinyl alcohol, polyacrylic acid or a salt thereof, oxidized starch, phosphorylated starch, and casein.

When the composition includes a thickening agent, the amount thereof is not particularly limited. For example, the amount of a thickening agent may be from 0.1 parts by mass to 5 parts by mass with respect to 100 parts by mass of the lithium-ion secondary-battery negative electrode material.

The composition for a lithium-ion secondary-battery negative electrode may include a conductive agent.

Examples of the conductive agent include carbon materials such as carbon black, graphite and acetylene black, and inorganic compounds such as oxides or nitrides that exhibit electroconductivity.

When the composition includes a conductive agent, the amount thereof is not particularly limited. For example, the amount of a conductive agent may be from 0.5 parts by mass to 15 parts by mass with respect to 100 parts by mass of the lithium-ion secondary-battery negative electrode material.

The material for a current collector is not particularly limited, and may be selected from aluminum, copper, nickel, titanium and stainless steel. The configuration of a current collector is not particularly limited, and may be selected from a foil, a punched foil or a mesh. It is also possible to use a porous material such as a porous metal or a carbon paper as a current collector.

When forming a negative electrode layer by applying a composition for a lithium-ion secondary-battery negative electrode to a current collector, the method of application is not particularly limited, and may be selected from known methods such as metal-mask printing, dip coating, spray coating, roll coating, doctor blade coating, comma coating, gravure coating and screen printing. After the application of the composition, a solvent included in the composition is removed by drying. The drying may be performed using a hot-air drier, an infrared drier, or a combination thereof. As necessary, a negative electrode layer may be subjected to rolling. The rolling may be performed using a flat-panel presser, a calendering roll, or a combination thereof.

In a case of integrating a composition for a lithium-ion secondary-battery negative electrode having a shape of a sheet or a pellet with a current collector, the method for the integration is not particularly limited, and may be performed using a roll, a flat-panel presser, or a combination thereof. The amount of pressure for the integration is preferably approximately from 1 MPa to 200 MPa, for example.

The density of the negative electrode layer is not particularly limited, and preferably from 1.1 g/cm$^3$ to 1.8 g/cm$^3$, more preferably from 1.1 g/cm$^3$ to 1.7 g/cm$^3$, further preferably from 1.1 g/cm$^3$ to 1.6 g/cm$^3$. When the density of the negative electrode layer is 1.1 g/cm$^3$ or more, an increase in electronic resistance is suppressed and the capacity tends to be increased. When the density of the negative electrode layer is 1.8 g/cm$^3$ or less, a reduction in input characteristics and a reduction in cycle characteristics tend to be suppressed.

<Lithium-Ion Secondary Battery>

The lithium-ion secondary battery according to the present disclosure includes the lithium-ion secondary-battery negative electrode according to the present disclosure, a positive electrode, and an electrolyte.

The positive electrode may be obtained in a similar manner to the method of preparing a negative electrode as mentioned above, by forming a positive-electrode layer on a current collector. As a current collector, a foil, a punched foil or a mesh made of metal or an alloy, such as aluminum, titanium or stainless steel, may be used.

The positive electrode material used for the formation of a positive-electrode layer is not particularly limited, and examples thereof include metal compounds having an ability to dope or intercalate lithium ions, such as metal oxides or metal sulfides, electroconductive polymers, and porous carbon.

Specific examples of the metal compounds include lithium cobalt oxide ($LiCoO_2$), lithium nickel oxide ($LiNiO_2$), lithium manganese oxide ($LiMnO_2$), multiple oxides thereof ($LiCo_xNi_yMn_zO_2$, x+y+z=1), multiple oxides including additive element M' ($LiCo_aNi_bMn_cM'_dO_2$, a+b+c+d=1, M': Al, Mg, Ti, Zr or Ge), spinel-type lithium manganese oxide ($LiMn_2O_4$), lithium-vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, and olivine-type $LiMPO_4$ (M: Co, Ni, Mn or Fe).

Specific examples of electroconductive polymers include polyacetylene, polyaniline, polypyrrol, polythiophene and polyacene.

The positive electrode material may be used singly or in combination of two or more kinds.

The electrolyte is not particularly limited, and a solution in which a lithium salt as an electrolyte is dissolved in a non-aqueous solvent (organic electrolyte) may be used, for example.

Examples of the lithium salt include $LiClO_4$, $LiPF_6$, $LiAsF_6$, $LiBF_4$ and $LiSO_3CF_3$. The lithium salt may be used singly or in combination of two or more kinds.

Examples of the non-aqueous electrolyte include ethylene carbonate, fluoroethylene carbonate, chloroethylene carbonate, propylene carbonate, butylene carbonate, vinylene carbonate, cyclopentanone, cyclohexylbenzene, sulfolane, propanesultone, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, methyl propyl carbonate, butyl ethyl carbonate, dipropyl carbonate, 1,2-dimethoxyethane, tetrahydrofuran, 2-methyltetrahydrofuran, 1,3-dioxolane, methyl acetate, ethyl acetate, trimethyl phosphate, and triethyl phosphate. The non-aqueous solvent may be used singly or in combination of two or more kinds.

The configuration of a positive electrode and a negative electrode in a lithium-ion secondary battery is not particularly limited. For example, the positive electrode and the negative electrode may be in a rolled-up state together with a separator interposed between the positive electrode and the negative electrode, or the positive electrode and the negative electrode may be in a flat-panel state together with a separator interposed between the positive electrode and the negative electrode.

The separator is not particularly limited, and may be a non-woven or woven cloth made of resin, a microporous film, or a combination thereof, for example.

Examples of the resin include polyolefin including an olefin as a major component, such as polyethylene and polypropylene. When a positive electrode and a negative electrode are not in direct contact with each other, a separator may not be used.

The shape of the lithium-ion secondary battery is not particularly limited, and may be selected from a laminate-type battery, a paper-type battery, a button-type battery, a layered-type battery, a cylindrical battery, and a rectangular battery.

The lithium-ion secondary battery according to the present disclosure is suitable for the applications having a large capacity, such as electric vehicles, power tools, and power storages. In particular, since the lithium-ion secondary battery according to the present disclosure exhibits excellent high-temperature resistance, the battery is suitable for automobiles for professional use such as buses and delivery cars.

EXAMPLES

In the following, the present disclosure is explained by referring to the examples, while the present disclosure should not be limited to the examples.

<Preparation of Graphite Particles>

Example 1

A petroleum-based coke (needle coke) having the properties shown in Table 1 was used as a raw material of graphite particles. In a cross-section of the coke particle, a needle-like striped pattern was observed in the overall area thereof.

The coke was roughly pulverized with a hammer mill, and a pulverized product was classified with a sieve having a mesh size of 3 mm, and further classified with a sieve having a mesh size of 1 mm, thereby collecting coke particles having a particle size of from 1 mm to 3 mm.

The obtained coke particles were subjected to pulverization and classification using a roller mill (K-VX mill, manufactured by Kurimoto, Ltd.), thereby obtaining coke particles having a flat shape. The D10, D50 and D90 in a volume-based particle size distribution of the coke particles were 5 μm, 14 μm and 24 μm, respectively.

A mixture was obtained by mixing 90% by mass of the coke particles and 10 parts by mass of a coal tar pitch (softening point: 100° C. to 150° C., quinoline insoluble content: 15% by mass or less, fixed carbon: 55% by mass to 75% by mass) under room temperature. A container including the mixture was depressurized by heating at 300° C. to 400° C. under a mixed gas flow of dried air and nitrogen. During the heating, it is possible to facilitate the discharge of a gas by moving a stirrer, thereby reducing a specific surface area of the particles. The time to stop the heating was determined by means of a phenomenon that the viscosity of the mixture decreases as a low-molecular-weight component included in the coal tar pitch volatilizes. Specifically, the heating was stopped when a current value of a stirrer became low and stable, and secondary particles having a bulk density of 0.7 g/cm$^3$ were obtained.

The secondary particles were packed in a case for graphitization, and subjected to graphitization at 3100° C. The graphitized particles was classified with a 300-mesh sieve, thereby obtaining graphite particles.

The D10, D50 and D90 in a volume-based particle size distribution of the graphite particles were 11 μm, 18 μm and 29 μm, respectively. The measurement results of the properties of the graphite particles are shown in Table 1.

Figure 2:
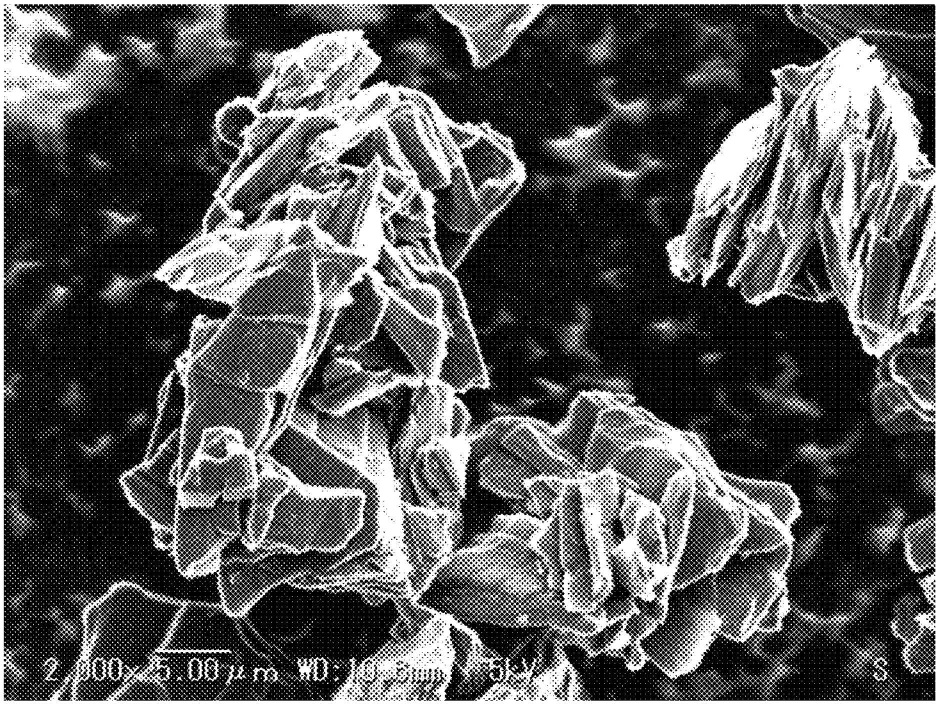
FIG. 2 is an electron micrograph of a negative electrode material obtained in Example 1.
Figure 3:
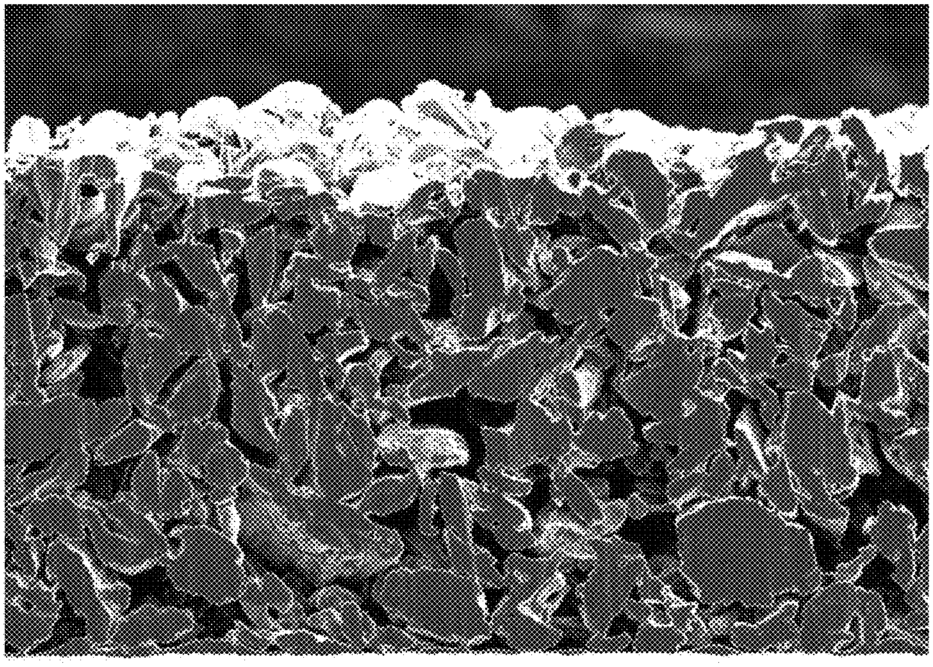
FIG. 3 is an electron micrograph of a cross-section of a negative electrode material obtained in Example 1.

An electron micrograph of an exterior appearance of the graphite particles and an electron micrograph of a cross-section of the graphite particles are shown in FIG. 2 and FIG. 3, respectively. As shown in the electron micrographs, the graphite particles included composite particles in which plural flat graphite particles were layered.

Example 2

Coke particles having a flat shape were obtained in a similar manner to Example 1, except that the number of rotation of a roller mill (K-VX mill, manufactured by Kurimoto, Ltd.) used for the classification was changed.

The D10, D50 and D90 in a volume-based particle size distribution of the coke particles were 6 μm, 15 μm and 27 μm, respectively.

Graphite particles were obtained from the coke particles in a similar manner to Example 1.

The D10, D50 and D90 in a volume-based particle size distribution of the graphite particles were 8 μm, 18 μm and 32 μm, respectively. The measurement results of the properties of the graphite particles are shown in Table 1.

Example 3

Coke particles having a flat shape were obtained in a similar manner to Example 1, except that the number of rotation of a roller mill (K-VX mill, manufactured by Kurimoto, Ltd.) used for the classification was changed.

The D10, D50 and D90 in a volume-based particle size distribution of the coke particles were 4 μm, 9 μm and 16 μm, respectively.

Graphite particles were obtained from the coke particles in a similar manner to Example 1.

The D10, D50 and D90 in a volume-based particle size distribution of the graphite particles were 8 μm, 12 μm and 18 μm, respectively.

Subsequently, a mixture of 96 parts by mass of the graphite particles and 4 parts by mass of a coal tar pitch (fixed carbon: 54%) was subjected to a thermal treatment at 900° C., thereby attaching a carbon to a surface of the graphite particles.

The D10, D50 and D90 in a volume-based particle size distribution of the graphite particles were 11 μm, 16 μm and 23 μm, respectively.

Comparative Example 1

A petroleum-based coke (mosaic coke) having the properties shown in Table 1 was used as a raw material of graphite particles.

The coke was roughly pulverized with a hammer mill, and a pulverized product was classified with a sieve having a mesh size of 3 mm, and further classified with a sieve having a mesh size of 1 mm, thereby collecting coke particles having a particle size of from 1 mm to 3 mm. The coke particles was grinded with a roller mill, and coke particles having an average particle size of 200 μm were obtained.

The coke particles were pulverized with a counter jet mill, and classified with a high-speed swirling-airflow classifier, thereby obtaining coke particles having a flat shape.

The D10, D50 and D90 in a volume-based particle size distribution of the coke particles were 4 μm, 15 μm and 35 μm, respectively.

Graphite particles were obtained from the coke particles in a similar manner to Example 1.

The D10, D50 and D90 in a volume-based particle size distribution of the graphite particles were 11 μm, 23 μm and 44 μm, respectively. The measurement results of the properties of the graphite particles are shown in Table 1.

Comparative Example 2

A petroleum-based coke (needle coke) having the properties shown in Table 1 was used as a raw material of graphite particles.

The coke was roughly pulverized with a hammer mill, and a pulverized product was classified with a sieve having a mesh size of 3 mm, and further classified with a sieve having a mesh size of 1 mm, thereby collecting coke particles having a particle size of from 1 mm to 3 mm. The coke particles was grinded with a roller mill, and coke particles having an average particle size of 200 μm were obtained.

The coke particles were pulverized with a counter jet mill, and classified with a high-speed swirling-airflow classifier, thereby obtaining coke particles having a flat shape.

The D10, D50 and D90 in a volume-based particle size distribution of the coke particles were 6 μm, 15 μm and 32 μm, respectively.

Graphite particles were obtained from the coke particles in a similar manner to Example 1.

The D10, D50 and D90 in a volume-based particle size distribution of the graphite particles were 13 μm, 20 μm and 42 μm, respectively.

Comparative Example 3

A petroleum-based coke (needle coke) having the properties shown in Table 1 was used as a raw material of graphite particles.

The coke was roughly pulverized with a hammer mill, and a pulverized product was classified with a sieve having a mesh size of 3 mm, and further classified with a sieve having a mesh size of 1 mm, thereby collecting coke particles having a particle size of from 1 mm to 3 mm. The coke particles was grinded with a roller mill, and coke particles having an average particle size of 200 μm were obtained.

The coke particles were pulverized with a counter jet mill, and classified with a high-speed swirling-airflow classifier, thereby obtaining coke particles having a flat shape.

The D10, D50 and D90 in a volume-based particle size distribution of the coke particles were 6 μm, 25 μm and 55 μm, respectively.

Graphite particles were obtained from the coke particles in a similar manner to Example 1.

The D10, D50 and D90 in a volume-based particle size distribution of the graphite particles were 7 μm, 27 μm and 58 μm, respectively.

Comparative Example 4

Spherical natural graphite was used as the graphite particles. The D10, D50 and D90 in a volume-based particle size distribution of the graphite particles were 7 μm, 16 μm and 25 μm, respectively. The measurement results of the properties of the graphite particles are shown in Table 1.

<Preparation of Negative Electrode>

A slurry was prepared by mixing 97.6 parts by mass of graphite particles, obtained in the Examples and the Comparative Examples, with 1.2 parts by mass of carboxymethylcellulose (CMC) and 1.2 parts by mass of styrene-butadiene rubber (SBR). The slurry was applied to a shiny side of an electrolyte copper foil by an amount of 10 g/cm$^2$, and subjected to preliminary drying at 90° C. for 2 hours. Subsequently, the product was pressurized to have a density of electrode of 1.65 g/cm$^3$ and subjected to a curing treatment at 120° C. for 4 hours in a vacuum atmosphere, thereby obtaining a lithium-ion secondary-battery negative electrode.

<Preparation of Lithium-Ion Secondary Battery>

A coin-shaped cell was prepared using the negative electrode prepared in the above process, metallic lithium as a counter electrode, a mixed solution of ethylene carbonate/ethyl methyl carbonate (3/7 by volume) including 1.0% by mass of vinylene carbonate and 1 M of $LiPF_6$ as an electrolyte, a polyethylene microporous film with a thickness of 25 μm as a separator, and a copper plate with a thickness of 250 μm as a spacer.

<Evaluation of Negative Electrode and Battery>

The properties of the negative electrodes and lithium-ion secondary batteries using the same, obtained in the Examples and the Comparative Examples, were measured by the following method.

(Specific Surface Area)

A negative electrode material was loaded into a measurement cell and subjected to a pretreatment by heating at 200° C. together with vacuum deairing. The sample was allowed to adsorb a nitrogen gas using a gas adsorption apparatus (ASAP2010, manufactured by Shimadzu Corporation). A specific surface area of the sample was obtained from the measurement results by a five-point BET analysis.

(Compression Pressure)

3.0 g of a negative electrode material was loaded into a mold having a diameter of 15 mm, and compressed at a constant rate of 10 mm/min with an autograph manufactured by Shimadzu Corporation. During the compression, the density of the negative electrode material during the compression was calculated from the volume of the same, i.e., a product of a distance between the base of the mold and the pressurized plane of the negative electrode material, and a base area of the mold. The press hammer of the autograph was attached with a load cell. The amount of pressure (kN/cm$^2$) at which the density of the negative electrode material was 1.8 g/cm$^3$ was regarded as a compression pressure of the negative electrode material.

(Elastic Energy/Plastic Deformation Energy)

The amount of elastic energy E1 and the amount of plastic deformation energy E2 were obtained under the same conditions for the measurement of a compression pressure, and the value of E1/E2 was calculated. Recording of the pressure during pressurization was conducted each time the pressurized plane of the negative electrode material moved for a distance of 1.67 μm.

(Spring-Back Ratio)

A spring back ratio (%) was obtained by dividing, with a standard density (1.8 g/cm$^3$) in the above-noted compression with an autograph, an absolute value of a difference between the standard density (1.8 g/cm$^3$) and the density of the negative electrode material after the spring back.

(Peak Intensity Ratio in Rhombohedral Structure)

The peak intensity ratio in rhombohedral structure of graphite particles (P1/P2) was obtained as an intensity ratio of a diffraction line of a rhombohedral structure (P1: diffraction angle 43.2°) and a diffraction line of a hexagonal structure (P2: diffraction angle 44.3°) in an X-ray diffraction pattern using CuKα rays.

(Degree of Graphitization)

A degree of graphitization was measured by the method as mentioned above using an X-ray diffractometer (MultiFlex from Rigaku Corporation).

(Interplanar Spacing)

The interplanar spacing ($d_{002}$) was calculated by a Bragg's equation from a diffraction peak corresponding to the carbon 002 plane, which appears at a position at which a diffraction angle 2θ is approximately from 24° to 27° in a diffraction profile. The diffraction profile was obtained by exposing a specimen to X-rays (CuKα) and measuring a diffraction line with a goniometer. The measurement was conducted under the following conditions.

Radiation source: CuKα (wavelength: 0.15418 nm)
Output power: 40 kV, 20 mA
Sampling width: 0.010°
Scanning range: 10° to 35°
Scanning rate: 0.5°/min $$2d \sin \theta = n\lambda \qquad \text{Bragg's equation:}$$

In the equation, d refers to a period length, n refers to an order of reflection, and X refers to a wavelength of the X-ray.

(Time for Infusion)

A negative electrode was pressurized to have a density of 1.65 g/cm$^3$ and cut into a circle with a diameter of 16φ. The negative electrode was attached to a glass substrate with a double-stick tape, and a flat electrode was formed on the glass substrate. 3 μL of PC (polycarbonate, manufactured by Kishida Chemical Co., Ltd.) was dropped onto the center of the electrode with a micropipette, and a time until the PC penetrated the electrode was measured. The measurement was performed on three electrodes, and an average thereof was calculated.

(Discharge Capacity)

The lithium-ion secondary battery was placed in a thermostat chamber at 25° C., and charged at a constant current value of 0.2 C until a voltage was 0V (V vs. $Li/Li^+$). Subsequently, the battery was charged at a constant voltage of 0V until the current value was 0.02 C. After an interval of 30 minutes, the battery was discharged at a constant current value of 0.2 C until the voltage was 1.5V (V vs. $Li/Li^+$), and the discharge capacity at this time was measured. The result is shown in Table 1.

(3 C Charging and Li Precipitation)

The lithium-ion secondary battery was placed in a thermostat chamber at 25° C., and charged at a constant current value of 0.1 C until a voltage was 0.005V (V vs. $Li/Li^+$). Subsequently, the battery was charged at a constant voltage of 0.005V until the current value was 0.05 C. After an interval of 30 minutes, the battery was discharged at a constant current value of 0.2 C until the voltage was 1.5V (V vs. $Li/Li^+$). The charging and discharging were conducted for three cycles, and the discharge capacity measured at the third cycle was regarded as 1 C in the Li precipitation test.

Subsequently, a fourth cycle of charging and discharging was performed on the battery. In the fourth cycle, the charging was performed at a current density of 3 C, at which the discharge capacity at the third cycle was charged in 20 minutes, and a controlled voltage of 1.5V.

A first inflection point in a differential profile (dV/dQ, wherein V is voltage and Q is electric capacity) of a charging curve obtained in the fourth cycle was regarded as a starting point of Li precipitation.

Figure 4:
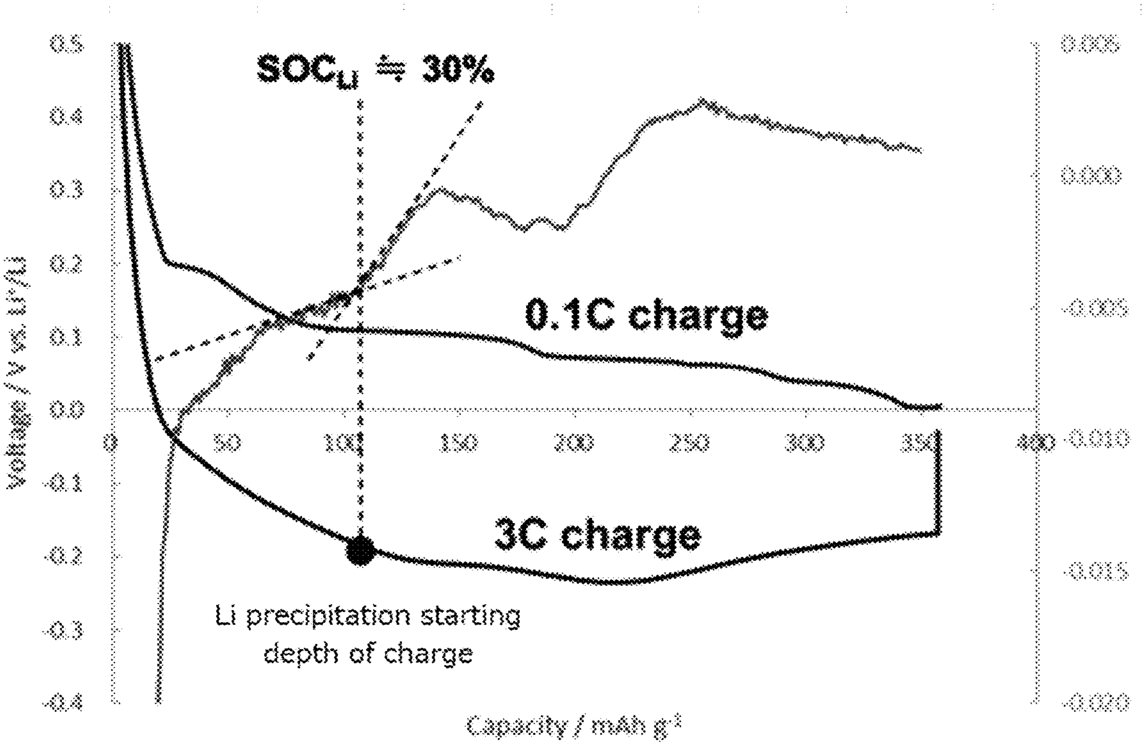
FIG. 4 is a graph used for the evaluation of Li precipitation resistance.

A percentage of the capacity at a starting point of Li precipitation with respect to a discharging capacity at the third cycle (or a discharging capacity at the fourth cycle adjusted to be an equal capacity) was used to evaluate the Li precipitation resistance. The result is shown in Table 1 and FIG. 4.

(High-Temperature Storage Maintenance Ratio and High-Temperature Storage Recovery Ratio)

Step 1: the lithium-ion secondary battery was placed in a thermostat chamber at 25° C., and charged at a constant current value of 0.2 C until a voltage was 0V (V vs. $Li/Li^+$). Subsequently, the battery was charged at a constant voltage of 0V until the current value was 0.02 C. After an interval of 30 minutes, the battery was discharged at a constant current value of 0.2 C until the voltage was 1.5V (V vs. $Li/Li^+$). The charging and discharging was performed for two cycles. Thereafter, the battery was charged at a constant current value of 0.2 C until a voltage was 0V (V vs. $Li/Li^+$), and then charged at a constant voltage of 0V until the current value was 0.02 C. The battery was placed in a thermostat chamber at 60° C. for 7 days.

Step 2: the battery was placed in a thermostat chamber at 25° C. and left for 60 minutes. Thereafter, the battery was discharged at a constant current value of 0.2 C until the voltage was 1.5V (V vs. $Li/Li^+$). The charging and discharging was performed for another cycle under the above-noted conditions.

The process under storage at 60° C. (Step 1) and the process after storage (Step 2) were performed for 3 times in total.

The high-temperature maintenance ratio and the high-temperature recovery ratio were calculated by the following equations.

High-temperature maintenance ratio (%)=(discharge capacity at 1st discharge at 25° C. after storage at 60° C. for 21 days)/(discharge capacity at 2nd discharge at 25° C. before storage at 60° C.)×100

High-temperature recovery ratio (%)=(discharge capacity at 2nd discharge at 25° C. after storage at 60° C. for 21 days)/(discharge capacity at 2nd discharge at 25° C. before storage at 60° C.)×100

TABLE 1

| | | Examples | | | Comparative Examples | | | |
|---|---|---|---|---|---|---|---|---|
| | | 1 | 2 | 3 | 1 | 2 | 3 | 4 |
| Graphite particles | Specific surface area [$m^2/g$] | 1.4 | 1.0 | 2.3 | 4.0 | 3.7 | 1.3 | 3.4 |
| | Compression pressure [$kN/cm^2$] | 3.14 | 3.20 | 3.98 | 2.02 | 1.78 | 2.48 | 3.55 |
| | Elastic energy E1 [N/m] | 8.04 | 9.20 | 10.61 | 4.90 | 3.07 | 4.44 | 9.43 |
| | Plastic deformation energy E2 [N/m] | 0.87 | 1.36 | 2.36 | 2.66 | 2.22 | 0.48 | 2.61 |
| | E1/E2 | 9.24 | 6.76 | 4.50 | 1.84 | 1.38 | 9.25 | 3.61 |
| | Spring-back ratio [%] | 33.7 | 32.7 | 34.1 | 18.3 | 15.1 | 27.3 | 24.7 |
| | Peak intensity ratio in rhombohedral structure | Not observed | | | | | | 0.22 |
| | Degree of graphitization [%] | 95.5 | 96.7 | 95.5 | 98.5 | 98.5 | 96.7 | 99.8 |
| | d002 [nm] | 3.358 | 3.357 | 3.358 | 3.355 | 3.355 | 3.357 | 3.354 |
| Cokes | CTE [$\times 10^{-6}$/° C.] | 2.6 | 2.6 | 2.6 | 6.5 | 4.1 | 3.0 | — |
| | HGI [—] | 43 | 43 | 43 | 20 | 33 | 50 | — |
| | Butanol absolute specific gravity [—] | 2.14 | 2.14 | 2.14 | 1.98 | 1.99 | 2.11 | — |
| | Pore volume [mL/g] | 0.76 | 0.76 | 0.76 | 1.70 | 1.36 | 0.98 | — |
| | Pore specific surface area [$m^2/g$] | 1.1 | 1.1 | 1.1 | 5.2 | 4.2 | 3.9 | — |
| | Total sulfur content [% by mass] | 0.2 | 0.2 | 0.2 | 0.2 | 0.3 | 0.3 | — |

TABLE 1-continued

| | | Examples | | | Comparative Examples | | | |
|---|---|---|---|---|---|---|---|---|
| | | 1 | 2 | 3 | 1 | 2 | 3 | 4 |
| Negative electrode | Orientation | 450 | 620 | 310 | 300 | 400 | 1,030 | 600 |
| | Time for infusion | 50 | 70 | 55 | 530 | 430 | 130 | 170 |
| Battery | Discharge capacity [Ah/kg] | 349 | 351 | 350 | 352 | 354 | 347 | 358 |
| | 3 C charging, Li precipication starting [%] | 24 | 22 | 32 | 10 | 8 | 15 | 30 |
| | High-temperature storage maintenance ratio [%] | 88.0 | 88.5 | 85.9 | 77.3 | 80.2 | 86.2 | 81.0 |
| | High-temperature storage recovery ratio [%] | 92.9 | 93.1 | 91.6 | 87.8 | 89.2 | 91.4 | 88.9 |

As shown in Table 1, the lithium-ion secondary batteries, using graphite particles of Examples 1-3 as a negative electrode material, exhibit excellent high-temperature resistance and rapid-charging characteristics.

The disclosure of Japanese Patent Application No. 2020-208625 is incorporated herein by reference in its entirety.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A lithium-ion secondary-battery negative electrode material, consisting of graphite particles satisfying the following (1) to (3):

(1) having a specific surface area of 2.7 $m^2/g$ or less;

(2) having a compression pressure of 2.8 $kN/cm^2$ or more; and (3) having a value, representing elastic energy/plastic deformation energy, or 4 or more.

2. The lithium-ion secondary-battery negative electrode material according to claim 1, having a spring-back ratio of 25% or more.

3. The lithium-ion secondary-battery negative electrode material according to claim 1, wherein the graphite particles comprise composite particles having a configuration in which plural flat graphite particles are layered.

4. A method for manufacturing a lithium-ion secondary-battery negative electrode material, the method comprising graphitizing a coke that satisfies the following (1) and (2):

(1) having a thermal expansion coefficient of $2.9\times10^{-6}$/° C. or less after calcination at 1400° C.; and (2) having a Hardgrove Grindability Index (HGI) of 47 or less after calcination at 1200° C.

5. The method for manufacturing a lithium-ion secondary-battery negative electrode material according to claim 4, wherein the coke has a butanol absolute specific gravity of 2.05 or more after calcination at 1200° C.

6. The method for manufacturing a lithium-ion secondary-battery negative electrode material according to claim 4, wherein the coke has a pore volume of 0.90 mL/g or less.

7. The method for manufacturing a lithium-ion secondary-battery negative electrode material according to claim 4, wherein the coke has a pore specific surface area of 3.0 $m^2/g$ or less.

8. The method for manufacturing a lithium-ion secondary-battery negative electrode material according to claim 4, comprising manufacturing a lithium-ion secondary-battery negative electrode material, the lithium-ion secondary-battery negative electrode material consisting of graphite particles satisfying the following (1) to (3):

(1) having a specific surface area of 2.7 $m^2/g$ or less;

(2) having a compression pressure of 2.8 $kN/cm^2$ or more; and (3) having a value, representing elastic energy/plastic deformation energy, or 4 or more.

9. A lithium-ion secondary-battery negative electrode, comprising a negative electrode material layer that comprises the lithium-ion secondary-battery negative electrode material according to claim 1, and a current collector.

10. A lithium ion secondary battery, comprising the lithium-ion secondary-battery negative electrode according to claim 9, a positive electrode, and an electrolyte.

* * * * *